United States Patent
Gohike et al.

(10) Patent No.: US 6,762,141 B2
(45) Date of Patent: Jul. 13, 2004

(54) CERAMIC MASS, METHOD FOR THE PRODUCTION OF A CERAMIC MASS AND USE OF A CERAMIC MASS

(75) Inventors: Silvia Gohike, Allershausen (DE); Ruth Männer, Oberpframmem (DE); Gabriele Preu, Munchen (DE); Wolfram Wersing, Bergen (DE)

(73) Assignee: Siemens Aktiengesellschaft, Munich (DE)

( * ) Notice: Subject to any disclaimer, the term of this patent is extended or adjusted under 35 U.S.C. 154(b) by 4 days.

(21) Appl. No.: 10/221,550

(22) PCT Filed: Feb. 15, 2001

(86) PCT No.: PCT/DE01/00581

§ 371 (c)(1),
(2), (4) Date: Sep. 13, 2002

(87) PCT Pub. No.: WO01/68554

PCT Pub. Date: Sep. 20, 2001

(65) Prior Publication Data

US 2003/0109375 A1 Jun. 12, 2003

(30) Foreign Application Priority Data

Mar. 13, 2000  (DE) .......................................... 100 12 103

(51) Int. Cl.$^7$ ........................ C04B 34/468; C04B 35/49
(52) U.S. Cl. ...................... 501/134; 501/135; 501/136; 501/137; 501/138; 501/139; 428/403; 428/404; 428/405
(58) Field of Search ................................ 501/134–139; 428/403–405

(56) References Cited

U.S. PATENT DOCUMENTS

| | | | | |
|---|---|---|---|---|
| 5,011,804 A | * | 4/1991 | Bergna et al. | 501/138 |
| 5,082,811 A | * | 1/1992 | Bruno | 501/134 |
| 5,264,403 A | | 11/1993 | Abe et al. | 501/139 |
| 5,296,426 A | * | 3/1994 | Burn | 501/139 |
| 5,310,422 A | | 5/1994 | Abdel-Latif | 106/635 |

FOREIGN PATENT DOCUMENTS

| | | |
|---|---|---|
| DE | 32 16 219 | 11/1982 |
| DE | 44 06 812 | 7/1995 |
| DE | 692 12 097 | 7/1996 |
| DE | 199 37 999 | 2/2000 |
| JP | 2000-26163 | * 1/2000 |
| WO | 93/06053 | * 4/1993 |
| WO | 94/10098 | * 5/1994 |
| WO | 97/44797 | 11/1997 |

OTHER PUBLICATIONS

David L. Wilcox et al., The Multilayer Ceramic Integrated Circuit (MCIC) Technology: Opportunities and Challenges, 1997 International Symposium on Microelectronics, ISHM, Philadelphia, pp. 17–23.

* cited by examiner

Primary Examiner—Karl Group
(74) Attorney, Agent, or Firm—Young & Thompson

(57) ABSTRACT

A ceramic mass includes one ceramic material and at least a second different ceramic material. Glass material is arranged between the ceramic materials. The glass material reduces the sintering temperature of the ceramic mass and prevents the various ceramic materials from forming a mixed crystal when the ceramic mass is sintered. The ceramic mass is suitable for use in LTCC technology for the production of capacitors whose permittivity is dependent upon a specific temperature range.

13 Claims, 2 Drawing Sheets

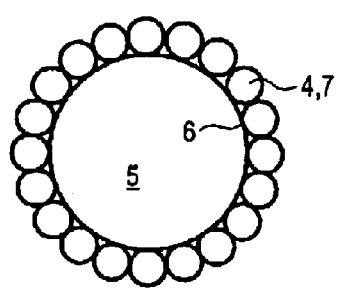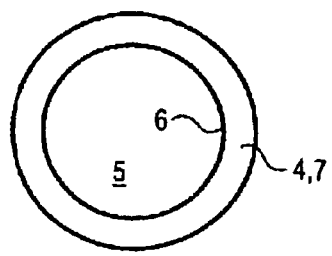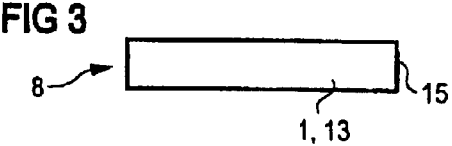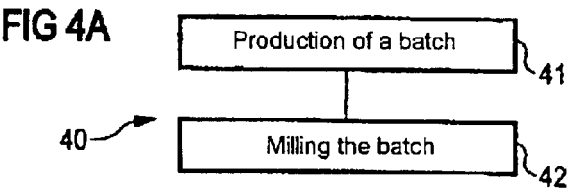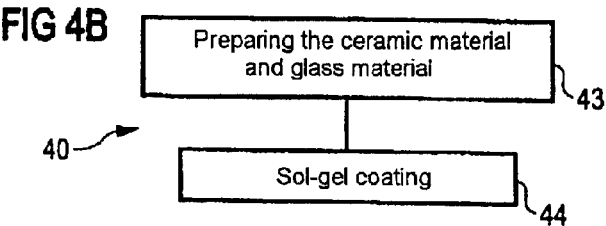

CERAMIC MASS, METHOD FOR THE PRODUCTION OF A CERAMIC MASS AND USE OF A CERAMIC MASS

BACKGROUND OF THE INVENTION

The invention relates to a ceramic mass having a ceramic material and at least one further ceramic material which is different than the ceramic material. In addition to the ceramic mass, the invention also describes a method for the production of the ceramic mass and a use of the ceramic mass.

DESCRIPTION OF THE RELATED ART

A ceramic mass of the said type is known, for example, from WO 97/44797. The ceramic mass is part of a multilayer capacitor of thin-film design. The multilayer capacitor comprises alternating electrode layers and ceramic layers. The ceramic layers consist of different ceramic material. The joint basis of the ceramic materials is, for example, a barium-strontium titanate system. A stoichiometric composition of the barium-strontium titanate changes from ceramic material to ceramic material. Each ceramic layer inherently has its own, relatively high temperature dependency of the relative permittivity. By contrast, the overall ceramic mass of the multilayer capacitor has a relatively low temperature dependency of the permittivity, taken as a mean of the temperature dependencies of the individual ceramic materials. In this way, by way of example, a temperature change of the ceramic mass with a X7R characteristic is produced.

To obtain this characteristic of the temperature change of the ceramic mass or the multilayer capacitor, a laminated stack comprising electrode layers and green ceramic sheets with different ceramic material is sintered. During the sintering, each green sheet becomes a ceramic layer. A contact surface between two adjacent green sheets or between two adjacent ceramic layers is relatively small compared to the volume of the green sheets or of the ceramic layers. Since interdiffusion of individual elements between the ceramic layers approximately takes place only in the contact region, there is a change in the stoichiometric composition of the ceramic materials only in the region of the contact surfaces. Only here is a solid solution formed. The stoichiometric composition of the ceramic materials of the ceramic layers is substantially retained. The characteristic of the temperature change of the ceramic mass can therefore be defined substantially by the choice of ceramic materials.

A sintering temperature used during the sintering of the laminated stack is relatively high. Therefore, to produce the multilayer capacitor for the electrode layers, it is necessary to use an electrode material with a relatively high melting point. An example of a material of this type is platinum.

A process which allows the sintering temperature to be reduced, so that even a low-melting metal with a high electrical conductivity, such as silver or copper, can be fed to a sintering process, is based on the LTCC (low temperature cofired ceramic) technology (cf. for example D. L. Wilcox et al., Proceedings 1997, ISHM, Philadelphia, pp. 17–23). In this case, the ceramic mass used is low-sintering glass ceramic. Glass ceramic consists of a ceramic material and a glass material.

SUMMARY OF THE INVENTION

It is an object of the present invention to describe a ceramic mass which has a sintering temperature which is as low as possible and a certain permittivity.

To achieve the object, the invention describes a ceramic mass having a ceramic material and at least one further ceramic material which is different than the ceramic material. The ceramic mass is characterized in that at least one glass material is arranged between the ceramic materials.

The ceramic mass may be a sintered ceramic, a green product or a loose bed of the ceramic materials comprising individual ceramic particles. The ceramic mass includes at least two different ceramic materials. In particular, more than two different ceramic materials are also conceivable. By way of example, the glass material is a borosilicate glass which is mixed with alkaline-earth metal oxides. In general, any glass material which is known from the LTCC technology is suitable. In particular, a mixture of various glass materials is also conceivable. In particular, a starting material (precursor) of a glass is also suitable as the glass material. This starting material is, for example, an alkali metal alkoxide or an alkaline-earth metal alkoxide. The glass is formed from the starting material.

The basic idea of the invention consists in reducing the size of the contact surface between the different ceramic materials with the aid of the glass material arranged between the ceramic materials. In this way, the interdiffusion of individual elements between the different ceramic materials is reduced. The ceramic mass can be subjected to a sintering process, during which the formation of a solid solution takes place to a reduced extent. The stoichiometric composition of the ceramic materials is substantially retained. In this context, it is particularly advantageous if there is scarcely any contact surface between the ceramic materials. The ceramic materials are separate from one another. The formation of a solid solution is substantially suppressed. Consequently, the permittivity of the ceramic mass is also independent of a ratio of the volume of the ceramic material to its contact surface areas with adjacent ceramic materials. The temperature change of the permittivity of the ceramic mass can be easily and reproducibly set by means of the ceramic material used.

In a particular configuration, at least one of the ceramic materials includes a ceramic powder with a powder surface at which the glass material is arranged. The ceramic powder is a form of comminution of the ceramic material. The comminution is obtained, for example, by milling using a mill. The ceramic powder comprises individual powder particles (grains) and is distinguished by a powder morphology. The powder morphology is given by the shape and size of the powder particles. The shape is, for example, round or polygonal. The size results from a diameter of a powder particle. The diameter may range from 10 nm to a few $\mu$m. The powder surface is a surface of the individual powder particles. The advantage of the ceramic powder is that a homogeneous batch of the ceramic materials can be obtained, and therefore a homogeneous temperature change of the ceramic mass can be set. The temperature dependency of the permittivity is substantially equal over the entire ceramic mass. There are no local differences in the temperature dependency. This is possible in particular if not just one ceramic material but rather all the ceramic materials used are present as ceramic powders in the ceramic mass.

To prevent powder particles comprising different ceramic materials from adjoining one another, the ceramic mass may be a more or less loose batch of powder particles and the glass material in the form of glass particles. In this case, the proportion of the glass material is so great that the likelihood of powder particles of the ceramic materials being in contact with one another is as low as possible.

In one particular configuration, the glass material is a homogeneous coating of the powder surface. The homogeneous coating allows effective separation of powder particles comprising different ceramic materials. The homogeneous coating may be a single, continuous coating. In this case, the powder surface is completely covered by the coating. It is also possible for a plurality of separate partial coatings to, be present. There may be a free powder surface which is not covered by the coating. The free powder surface is dimensioned in such a way that contact between powder particles made from different ceramic materials is substantially ruled out. Furthermore, it is conceivable for the coating to be formed by glass particles with a smaller diameter than the diameter of the powder particle which adjoin one another at the surface of a powder particle and are fixedly joined to the powder surface.

As the proportion of the glass material in the ceramic mass increases, the sintering temperature drops. However, to obtain a permittivity which is as high as possible, as may be necessary, for example, in a capacitor, the proportion of the glass material should be as low as possible. This problem can be solved by the homogeneous coating and the effective separation between the ceramic materials which it provides. The homogeneous coating allows the proportion of the glass material to be kept at a low level while achieving a highly efficient separation. Therefore, sintering temperature and permittivity of the ceramic mass can be set substantially independently of one another.

In a particular configuration, the ceramic material and the further ceramic material include at least one identical chemical element, in which case the proportion of the element in the ceramic material and the proportion of the element in the further ceramic material differ. By way of example, the ceramic materials are based on a common ceramic base system. The stoichiometric composition of this system changes from ceramic material to ceramic material. An example of a ceramic base system of this type is barium strontium titanate ($Ba_{1-u}Sr_uTiO_3$, BST) or barium-zirconium titanate ($BaZr_xTi_{1-x}O_3$, BZT). However, it is also conceivable for the ceramic materials to belong to different base systems.

In particular, the ceramic mass has a temperature dependency of a relative permittivity, which is lower within a defined temperature range than a temperature dependency of a relative permittivity of one of the ceramic materials in the temperature range. The fact that different ceramic materials are used allows the temperature change to be set. By way of example, an X7R or at least a Z5U characteristic can be set. The decisive factor is that the formation of a solid solution as a result of interdiffusion between the ceramic materials is suppressed by the glass material during the sintering.

In a particular configuration, the ceramic material and/or the further ceramic material include at least one substance which is selected from the group consisting of $Ba_{1-u}Sr_uTiO_3$ and/or $BaZr_xTi_{1-x}O_3$, with u and x selected from a range from zero to one inclusive. By way of example, the ceramic mass includes seven ceramic materials, having the stoichiometric compositions $Ba_{0.4}Sr_{0.6}TiO_3$, $Ba_{0.5}Sr_{0.5}TiO_3$, $Ba_{0.6}Sr_{0.4}TiO_3$, $Ba_{0.7}Sr_{0.3}TiO_3$, $Ba_{0.8}Sr_{0.2}TiO_3$, $Ba_{0.9}Sr_{0.1}TiO_3$ and $BaTiO_3$.

In a particular configuration, lead is present in an amount of less than 0.1% by weight, in particular less than 0.001% by weight. A low-sintering ceramic mass as an alternative to a relaxer system, such as lead magnesium niobate (PMN), is accessible with the aid of the base systems barium-strontium titanate and/or barium-zirconium titanate and the glass material.

In addition to the ceramic mass which has been described, the object is also achieved by a method for producing the ceramic mass. In this method, a coating which includes the glass material is produced at a surface of at least one of the ceramic materials. In a preferred configuration, a ceramic powder of the ceramic material and, as the surface, the powder surface of the ceramic powder are used.

In particular, the following method steps are carried out: a) production of a batch comprising at least one of the ceramic materials and the glass material, and b) milling the batch.

The milling homogenizes the batch of ceramic material and glass material. The particle surfaces of the ceramic material are covered with the glass material. The glass material therefore forms the coating of the particle surfaces. It is conceivable for only one of the ceramic materials to be treated in this way and then mixed with the further ceramic material. It is also possible for in each case one ceramic material to be milled together with the glass material, or alternatively for both ceramic materials to be milled simultaneously with the glass material. The coating reduces the likelihood of grain-grain contact between ceramic particles made from different ceramic material occurring.

For effective coating of the ceramic materials and/or of the powder surfaces, it is advantageous to use a glass material which consists of glass particles which have a smaller diameter than the ceramic particles used. In particular, a glass material with nanometer-scale glass particles is used for this purpose. The diameter of a glass particle may be selected from the range from 10 nm to 1 $\mu$m inclusive.

In a particular configuration, solution coating of the surface of the ceramic materials is carried out. In particular, a sol-gel process is carried out during the solution coating. Other methods, such as for example an emulsion process, are also conceivable. During the solution coating, it is preferable for a starting material of a glass to be applied to the surface. A coating comprising the starting material is formed.

According to a further aspect of the invention, the ceramic mass described above is used for the production of a green ceramic product. The green ceramic product is distinguished by the fact that the ceramic mass can be compacted further by sintering. The green product may be a green sheet comprising the ceramic mass and an organic binder or an aqueous dispersion binder. The green product may also consist only of the compressed ceramic mass. A loose bed is also conceivable, inside a shaping envelope. It is also possible for the ceramic mass to be used as a ceramic screen-printing paste to produce the green product. Furthermore, it is conceivable for the ceramic mass to be in the form of a sintered ceramic body and to be fed in this form to a further sintering process.

The green product comprising the ceramic mass is used, for example, to produce a capacitor. An example of a capacitor of this type is a multilayer capacitor. For this purpose, ceramic green sheets which have been printed with electrode layers, arranged on top of one another to form a stack, laminated, have had the binder removed and have been sintered, are produced with the aid of the ceramic mass. Each of the green sheets preferably includes the same ceramic mass. However, it is also conceivable for the ceramic mass to differ from green sheet to green sheet.

The capacitor may also be a decoupling capacitor. For this purpose, by way of example, a screen-printing paste is produced from the ceramic mass and is used to produce a dielectric layer of the decoupling capacitor by means of a screen-printing process. The decoupling capacitor can easily be integrated in a multilayer ceramic substrate and does not have to applied to a surface of the ceramic substrate. The capacitor may be locally integrated in the ceramic substrate, for example directly at an IC connection which is to be blocked off. The ceramic mass is particularly suitable for integrating decoupling capacitors in ceramic substrates which are produced with the aid of the LTCC technology. By way of example, the ceramic substrate has a high-quality, compact conducting structure (stripline, triplate) for a resonator, a coupler and/or a bandpass filter. For this purpose, low-melting metals such as silver or copper with a high electrical conductivity are used in the LTCC technology. With the aid of the ceramic mass, decoupling capacitors with a capacitance of from 30 pF to 3 nF inclusive can be integrated in these ceramic substrates, which are sintered at a sintering temperature below 950° C.

To summarize, the invention results in the following advantages:

The different ceramic materials of the ceramic mass are separated from one another by the glass material. There is no formation of a solid solution during the sintering of the ceramic mass. Ceramic materials of different compositions are retained. A dense ceramic can, be obtained without the properties of the individual ceramic materials changing. In this way, it is possible, for example, to obtain a relatively high permittivity in the ceramic mass with a low temperature change.

In particular with the aid of a homogeneous coating of the powder surfaces of the ceramic materials, it is possible to set the sintering temperature and the permittivity or the temperature change in the permittivity of the ceramic mass without difficulty. Ceramic masses with a sintering temperature of below 950° C. can be obtained and can be used as dielectric material for decoupling capacitors with a capacitance of 30 pF to 3 nF inclusive.

The ceramic mass is suitable for LTCC technology. Consequently, it is possible to produce high-quality, compact conducting structures.

BRIEF DESCRIPTION OF THE DRAWINGS

The ceramic mass, the method for producing the ceramic mass and the use of the ceramic mass are presented below with reference to a number of exemplary embodiments and the associated figures. The figures are diagrammatic and not to scale.

FIGS. 2a and 2b show a ceramic particle, the surface of which has a homogeneous coating of a glass material.

FIG. 3 shows a green ceramic product.

FIGS. 4a and 4b show a method for producing the ceramic mass.

DESCRIPTION OF THE PREFERRED EMBODIMENTS

Figure 1A:
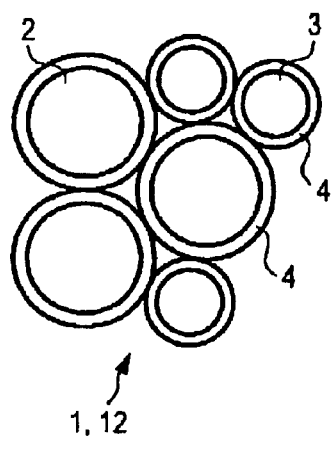
FIGS. 1a to 1d each show a ceramic mass.

The ceramic mass 1 includes a ceramic material 2 and further ceramic materials 3. A glass material 4 is arranged between the ceramic materials 2 and 3. The glass material 4 is a borosilicate glass which also contains alkaline-earth metal oxides.

According to a first embodiment, the ceramic mass 1 is a powder mixture 12 (FIG. 1a). In this case, the ceramic mass 1 is present as a batch of ceramic powders 5 comprising the different ceramic materials 2 and 3. The ceramic powders 5 consist of ceramic particles 10 with a mean diameter of 100 nm. The glass material 4 is arranged as a homogeneous coating 7 at the powder surfaces 6 of the ceramic materials 2 in order for the glass material 4 to be arranged between the ceramic materials 2 and 3 (FIGS. 2a and 2b). The coating 7 comprising the glass material 4 reduces the size of the contact surface between the powder particles 5 of the different ceramic materials 2 and 3.

To produce the powder mixture 12 of the ceramic mass 1, the coating 7 is produced at the powder surface 6 of the ceramic materials 2 and 3. A glass material 4 having glass particles 9 which have a mean diameter of 10 nm is used for this purpose. In a first method step 41 (FIG. 4a), a batch 11 (FIG. 1d) is produced from the ceramic materials 2 and 3 and the glass material 4. In a further method step 42, this batch 11 is milled in a mill, during which process the coating 7 is formed. As an alternative to the method described, the ceramic powder 5 and the glass material 4 are prepared (method step 43), in order to produce the coating 7 in a sol-gel process 44 (FIG. 4b).

Figure 1B:
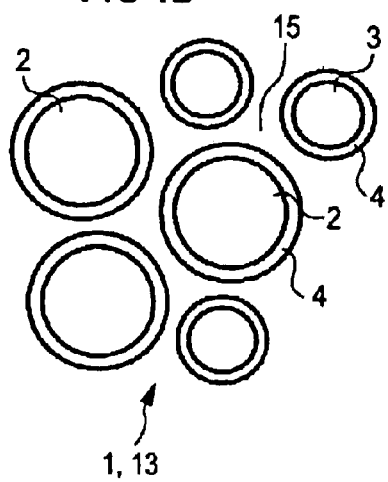

According to a second embodiment, the ceramic mass 1 is part of a green ceramic product 8 (FIGS. 1b and 3). The green product 8 is a green ceramic sheet and includes an organic binder 15. To produce the green sheet 8, the ceramic mass 1 is used in the form of the batch 11, but in particular in the form of the powder mixture 12. The green sheet 8 is used to produce a ceramic multilayer capacitor having one of the temperature change characteristics described below.

Figure 1C:
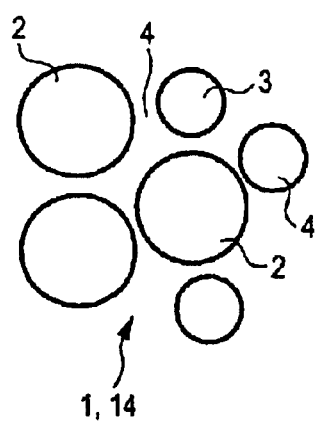
Figure 1D:
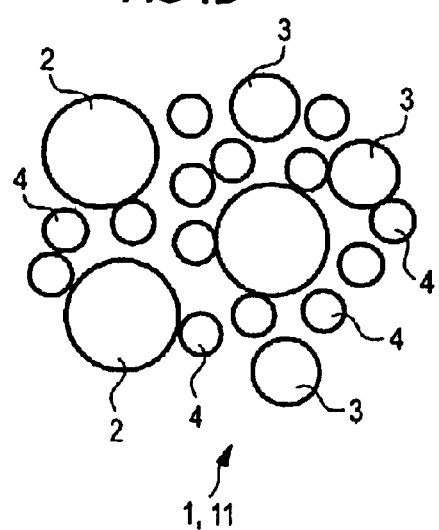

According to a further embodiment, the ceramic mass 1 is a ceramic 14 which has already been sintered (FIG. 1c). The glass material 4 is arranged between the ceramic particles 5 of the various ceramic materials 2 and 3. The ceramic materials 2 and 3 are present in a matrix of the glass material 4.

EXAMPLE 1

The ceramic materials 2 and 3 are based on the barium-strontium titanate system. The proportion of the elements varies from ceramic material to ceramic material. The ceramic materials 2 and 3 have the following stoichiometric compositions: $Ba_{0.4}Sr_{0.6}TiO_3$, $Ba_{0.5}Sr_{0.5}TiO_3$, $Ba_{0.6}Sr_{0.4}TiO_3$, $Ba_{0.7}Sr_{0.3}TiO_3$, $Ba_{0.8}Sr_{0.2}TiO_3$, $Ba_{0.9}Sr_{0.1}TiO_3$ and $BaTiO_3$. In the temperature range −50° C. to 150° C., the ceramic mass 1 has a constant relative permittivity Er of approximately 12 000 to 17 000. In this way, the X7R characteristic of the temperature change is implemented. The temperature dependency of the relative permittivity is considerably lower than the temperature dependency of the relative permittivity of the individual ceramic materials.

EXAMPLE 2

The Z5U characteristic is produced with the aid of the barium-zirconium titanate system. The ceramic materials 2 and 3 have the following stoichiometric compositions: $BaZr_{0.25}Ti_{0.75}O_3$, $BaZr_{0.2}Ti_{0.8}O_3$, $BaZr_{0.13}Ti_{0.87}O_3$, $BaZr_{0.06}Ti_{0.94}O_3$, $BaZr_{0.04}Ti_{0.96}O_3$, and $BaTiO_3$.

What is claimed is:

1. An LTCC ceramic mass comprising:
   a first ceramic material,
   at least one further ceramic material which is different from the first ceramic material, and
   at least one glass material arranged between the first and further ceramic materials,
   wherein
   the LTCC ceramic mass has a sintering temperature of below 950° C., and
   lead is present in an amount of less than 0.001% by weight.

2. The LTCC ceramic mass as claimed in claim 1, in which at least one of the first and further ceramic materials includes a ceramic powder with a powder surface at which the glass material is arranged.

3. The LTCC ceramic mass as claimed in claim 2, in which the glass material is a homogeneous coating of the powder surface.

4. The LTCC ceramic mass as claimed in claim 1, in which the first ceramic material and the further ceramic material include at least one identical chemical element, and the proportion of the element in the first ceramic material and the proportion of the element in the further ceramic material differ.

5. The LTCC ceramic mass as claimed in claim 1, in which the LTCC ceramic mass has a temperature dependency of a relative permittivity, which is lower within a defined temperature range than a temperature dependency of a relative permittivity of one of the first and further ceramic materials in the temperature range.

6. The LTCC ceramic mass as claimed in claim 1, in which the first ceramic material and the further ceramic material includes at least one substance which is selected from the group consisting of $Ba_{1-u}Sr_uTiO_3$ and/or $BaZr_xTi_{1-x}O_3$, with u and x selected from a range from zero to one inclusive.

7. A method for producing the LTCC ceramic mass as claimed in claim 1, comprising a step of applying a coating which includes the glass material to a surface of at least one of the first and further ceramic materials.

8. The method as claimed in claim 7, wherein the first ceramic comprises a ceramic powder with a powder surface, and the coating is applied to the powder surface.

9. The method as claimed in claim 7, wherein the glass material applied comprises nanometer-scale glass particles.

10. The method as claimed in claim 7, in which the following method steps are carried out:
    a) production of a batch comprising the first ceramic material and the glass material, and
    b) milling the batch.

11. The method as claimed in claim 7, in which solution coating is carried out.

12. The method as claimed in claim 11, in which a sol-gel process is carried out during the solution coating.

13. A method of producing a green ceramic product comprising forming the LTCC ceramic mass as claimed in claim 1 to produce a green ceramic product.

* * * * *